United States Patent
Chang et al.

(10) Patent No.: US 9,870,040 B2
(45) Date of Patent: *Jan. 16, 2018

(54) CHANGING SETTINGS FOR A TRANSIENT PERIOD ASSOCIATED WITH A DETERMINISTIC EVENT

(71) Applicant: Rambus Inc., Sunnyvale, CA (US)

(72) Inventors: Yu Chang, Los Altos, CA (US); Lei Luo, Chapel Hill, NC (US); Kyung Suk Oh, Cupertino, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,681

(22) Filed: Feb. 1, 2016

(65) Prior Publication Data
US 2016/0209902 A1    Jul. 21, 2016

Related U.S. Application Data

(63) Continuation of application No. 14/351,456, filed as application No. PCT/US2012/059821 on Oct. 11, 2012, now Pat. No. 9,304,568.

(Continued)

(51) Int. Cl.
*H04B 1/04* (2006.01)
*G06F 1/32* (2006.01)
(Continued)

(52) U.S. Cl.
CPC ............. *G06F 1/3203* (2013.01); *H04B 1/12* (2013.01); *H04L 25/03006* (2013.01); *H04L 25/03012* (2013.01); *H04L 25/03057* (2013.01); *H04L 7/0054* (2013.01); *H04L 7/033* (2013.01); *H04L 25/03127* (2013.01); *H04L 25/03146* (2013.01); *H04L 25/03853* (2013.01); *H04L 2025/03433* (2013.01)

(58) Field of Classification Search
CPC . G06F 1/32; G06F 1/30; G06F 1/3237; G06F 1/3203; Y02B 60/1221
USPC ........................................................ 455/127.1
See application file for complete search history.

(56) References Cited

U.S. PATENT DOCUMENTS 7,521,988 B2   4/2009   Shin
RE40,918 E    9/2009   Dupuy
(Continued)

OTHER PUBLICATIONS

International Search Report and Written Opinion dated Mar. 20, 2013 in international Application No. PCT/US2012/059821. 9 pages.

*Primary Examiner* — Sanh Phu
(74) *Attorney, Agent, or Firm* — Lance Kreisman; Peninsula Patent Group

(57) ABSTRACT

Disclosed embodiments relate to a system that changes transmitter and/or receiver settings to deal with reliability issues caused by a predetermined event, such as a change in a power state or a clock start event. One embodiment uses a first setting while operating a transmitter during a normal operating mode, and a second setting while operating the transmitter during a transient period following the predetermined event. A second embodiment uses similar first and second settings in a receiver, or in both a transmitter and a receiver employed on one side of a bidirectional link. The first and second settings can be associated with different swing voltages, edge rates, equalizations and/or impedances.

20 Claims, 10 Drawing Sheets

Related U.S. Application Data

(60) Provisional application No. 61/546,967, filed on Oct. 13, 2011.

(51) Int. Cl.
  *H04B 1/12* (2006.01)
  *H04L 25/03* (2006.01)
  *H04L 7/00* (2006.01)
  *H04L 7/033* (2006.01)

(56) References Cited

U.S. PATENT DOCUMENTS

| | | |
|---|---|---|
| 9,304,568 B2 * | 4/2016 | Chang ................. G06F 1/32 |
| 2004/0184486 A1 * | 9/2004 | Hethuin ............... H04B 1/7183 |
| | | 370/503 |
| 2007/0030156 A1 | 2/2007 | Schlager et al. |
| 2008/0057883 A1 | 3/2008 | Pan |
| 2008/0144248 A1 | 6/2008 | Crawley et al. |
| 2009/0054008 A1 | 2/2009 | Satou |
| 2009/0189664 A1 | 7/2009 | Remington |
| 2010/0329325 A1 * | 12/2010 | Mobin ............... H04L 25/03343 |
| | | 375/232 |
| 2013/0051442 A1 | 2/2013 | Cooper et al. |
| 2013/0227329 A1 | 8/2013 | Leibowitz et al. |

* cited by examiner

CHANGING SETTINGS FOR A TRANSIENT PERIOD ASSOCIATED WITH A DETERMINISTIC EVENT

CROSS-REFERENCE TO RELATED APPLICATIONS

This application is a Continuation of U.S. Ser. No. 14/351, 456, filed Apr. 11, 2014, entitled "RECEIVER WITH ENHANCED ISI MITIGATION" which claims priority from International Application No. PCT/US2012/067277 published as WO 2013/085811 A1 on Jun. 13, 2013, which claims priority from U.S. Provisional Application No. 61/567,341, filed Dec. 6, 2011, entitled "RECEIVER WITH ENHANCED ISI MITIGATION." Application Ser. No. 14/351,456, International Application No. PCT/US2012/067277 and U.S. Provisional Application No. 61/567,341 are hereby incorporated by reference in their entirety.

BACKGROUND

Field

Disclosed embodiments generally relate to techniques for dealing with reliability issues in clocked systems. More specifically, disclosed embodiments relate to techniques where transmitter or receiver settings are changed during a transient period associated with a deterministic event, such as a change in a power state or clock start event for a personal computer or a mobile computing system.

Related Art

Extending battery life is a primary consideration in portable computing devices, such as laptop computers and smartphones. To conserve power, portable computing devices often halt clock signals to specific circuits until a later time. This clock-stopping technique is effective at reducing power consumption because the Complementary Metal Oxide Semiconductor (CMOS) circuitry within a portable computing device consumes substantially more power while the circuits are switching, and substantially less power while the circuits are idle.

Unfortunately, stopping and starting clock signals in a computer system can adversely affect system performance. To provide one example, a given integrated circuit (IC) within a computer system typically has a power delivery network (PDN), which comprises both on-chip and off-chip components. When a clock signal to the IC (or a clock signal inside the IC) is stopped to save power and then restarted, the IC immediately starts demanding power from the PDN. Because the PDN has a complex impedance, this sudden increase in demand for power causes a transient voltage response in the PDN. As a result, the voltage supplied to circuits with the IC typically starts to droop and can cause ringing. These voltage fluctuations can cause clock and data signals in the IC to have different delays, which can cause timing margins to decrease and thereby cause data errors.

These problems with voltage fluctuations can be avoided by simply waiting a period of time until the voltage fluctuations or other transient issues diminish. However, in computer systems where clock signals are stopped and started frequently, the extra waiting time can adversely affect computer system performance, for example, by delaying system response following a wake-up event.

Hence, what is needed is a method and an apparatus that supports stopping and starting clock signals within a computer system without the above-described problems.

DETAILED DESCRIPTION

This disclosure provides methods and devices that mitigate transient effects associated with clock change events by adjusting transmitter and/or receiver settings. In one embodiment, transmitter and/or receiver settings are changed for the transient period associated with a clock change event, before resuming normal operating parameters. For example, a transmitter can have its swing or data-carrying level increased, or having its characteristic impedance or equalization parameters changed, so as to effectively change how a signal is electronically driven and thereby enhance reliability during the transient period. Similar techniques can also be applied to a receiver. In one embodiment, these techniques can also be used to force correct interpretation of initial bits by a decision feedback-based receiver (i.e., a receiver with a decision feedback equalizer), so that the receiver does not require a "seed" or a settling time before beginning live operation. Other applications of adjusting transmitter and/or receiver settings in association with transient events will become apparent from the description provided below.

Clocked Systems

Figure 1A:
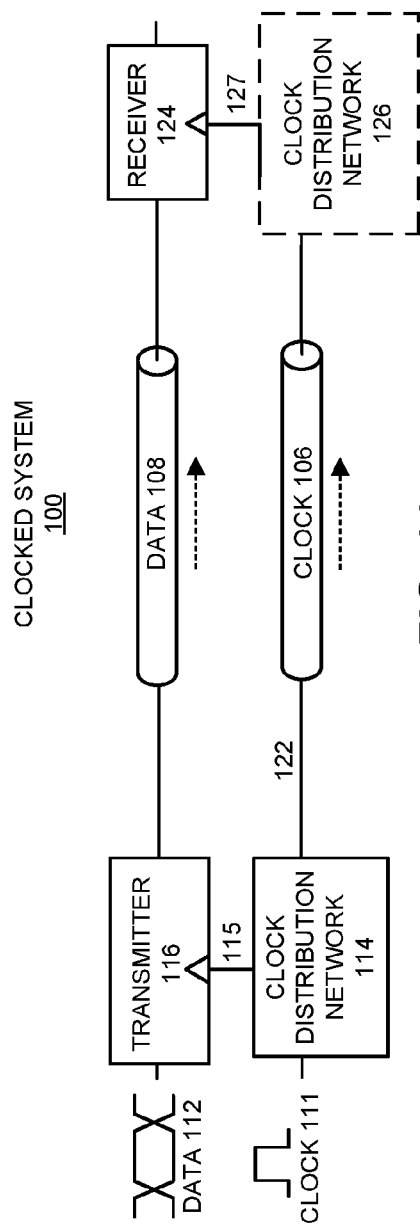
FIG. 1A illustrates a first clocked system in accordance with disclosed embodiments.

FIG. 1A illustrates a first clocked system 100 in accordance with disclosed embodiments. Clocked system 100 can generally be incorporated into any type of computing device or computing system which transfers data, for example, in connection with transfer of data between a processor and memory. More specifically, clocked system 100 can include a server, a desktop computer, a portable laptop computer, a tablet or notebook computer, or a system within a smartphone or other portable device.

In FIG. 1A, first clocked system 100 includes a transmitter 116 which transfers data signals 112 to a receiver 124 though a data path 108. The transmitter is clocked by a transmitter clock signal 115, which is generated from a reference clock 111 by a first clock distribution network 114. First clock distribution network 114 also generates a second clock signal 122 that propagates together with data signals along clock path 106, to the receiver 124. The receiver may include a second clock distribution network 126, illustrated in phantom lines to indicate its optional nature. A receiver clock signal 127 derived from second clock signal 122 is used to time the sampling of data arriving via data path 108. Note that although the term "clock signal" is used, the signal 122 that propagates together with data can be any timing signal, including a strobe or other non-continuously-transitioning signal.

Figure 1B:
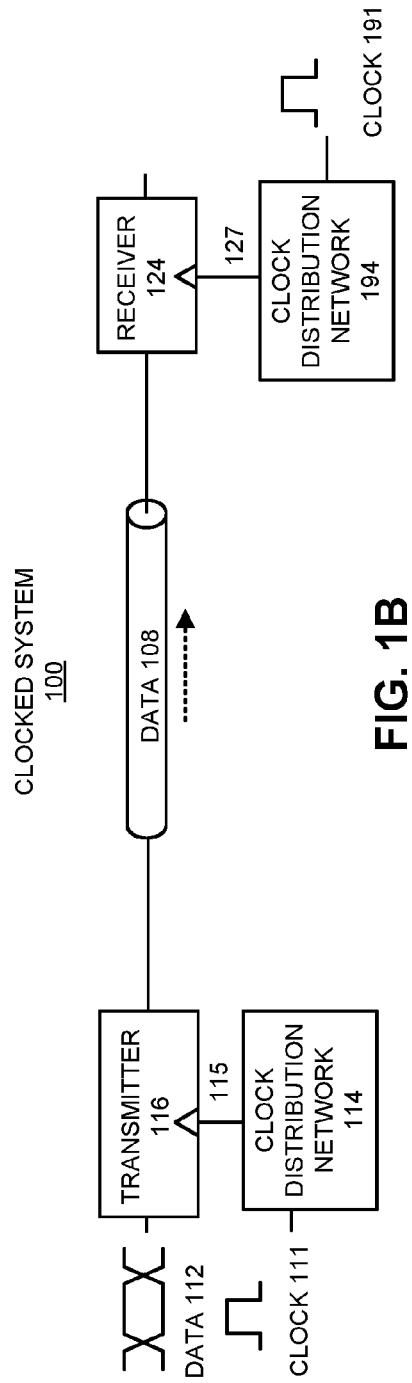
FIG. 1B illustrates a second clocked system in accordance with disclosed embodiments.

Referring to FIG. 1B, another option is to use independently generated clock signals and associated clock distribution networks for transmitter 116 and receiver 124. In FIG. 1B, transmitter 116 transfers data signals 112 to a receiver 124 though a data path 108. These data signals 112 are timed according to a transmitter clock signal 115, which once again is generated from a reference clock signal 111 by a first clock distribution network 114. At a receiver 124, incoming symbols are sampled according to a receiver clock 127, which is derived from a second reference clock 191 by second clock distribution network 194. The second reference clock 191 is typically selected to be matched in frequency to first reference clock 111, with a phase-lock-loop ("PLL"), delay-locked-loop ("DLL") or other circuitry being used to fine-tune frequency and phase of receiver clock signal 115 so as sample incoming data symbols at an optimal time.

The particular type of implementation used will vary in dependence on system design constraints, and of course, other designs are also possible. The implementation of FIG. 1A is readily adapted to a design where it is desired to implement as much power-hungry circuitry as possible on one side of data path 108 (e.g., in a central chip such as a CPU or memory controller) while minimizing the use of such circuitry on the other side of the data path 108 (e.g., in a memory device not having an on-board PLL). Other constraints may prompt the use of the architecture of FIG. 1B or other designs.

Voltage Noise

During operation of clocked system 100 in FIGS. 1A and 1B, a number of deterministic events can cause voltage noise. The term "deterministic event" refers to a predictable change in the operating state of the system, such as a power-up event, a clock-starting event, a clock-frequency-increasing event, a power-down event, a clock-stopping event, a clock-frequency-decreasing event, a power-state-changing event, or another type of event. Such deterministic events can be detected by logic within clocked system 100 which controls states of operation (e.g., power states) and clock frequencies for clocked system 100.

Figure 2:
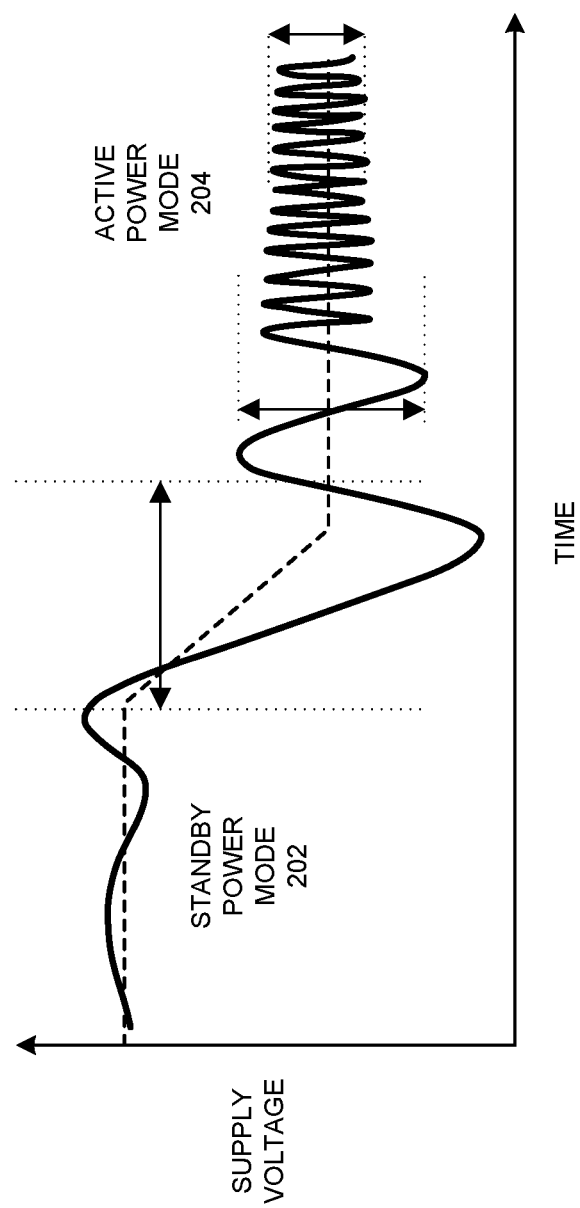
FIG. 2 presents a graph illustrating voltage noise during a power-state transition in accordance with disclosed embodiments.

FIG. 2 presents a graph illustrating voltage noise during a power-state transition in accordance with disclosed embodiments. More specifically, FIG. 2 illustrates exemplary voltage noise caused when a computer system transitions from a standby power state 202 to an active power state 204. During the transition to the active power state 204, a number of clock signals are turned on which causes the system to start consuming power. This causes a dip in the supply voltage and associated ringing which is illustrated in FIG. 2. This ringing can cause jitter in clock distribution network 114 in FIG. 1. This jitter, in turn, leads to an inconsistent sampling time, which can cause data errors.

Boosting Voltage Swing and Increasing Edge Rate

To deal with the problems that arise during events, such as power transitions, disclosed embodiments change transmitter settings during a transient period associated with a deterministic event, such as a power-state-changing event. For example, disclosed embodiments can increase the voltage swing or edge rate of the transmitter during this transient period, or can take other similar types of actions such as adjusting equalization parameters; note that the term "edge rate" refers to the rate of voltage change when the signal is switching from a low voltage to a high voltage or from a high voltage to a low voltage.

Figure 3A:
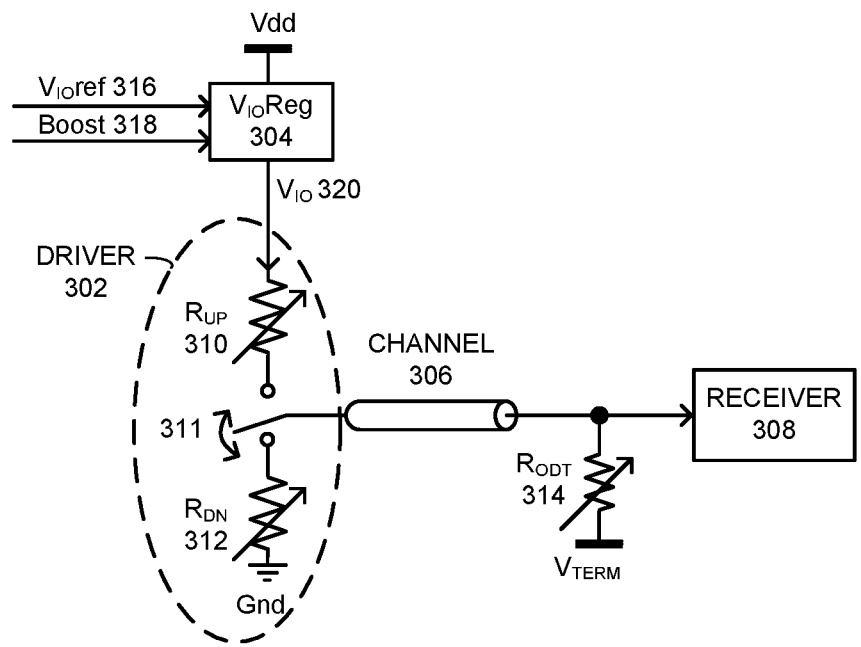
FIG. 3A illustrates a driver that provides a boosted voltage swing in accordance with disclosed embodiments.

In particular, FIG. 3A illustrates a driver 302 that can provide a boosted voltage swing and/or an increased edge rate in accordance with disclosed embodiments. Driver 302 is coupled to a receiver 308 through a channel 306. The signal from driver 302 is terminated at receiver 308 through an adjustable resistor RODT 314.

Figure 3B:
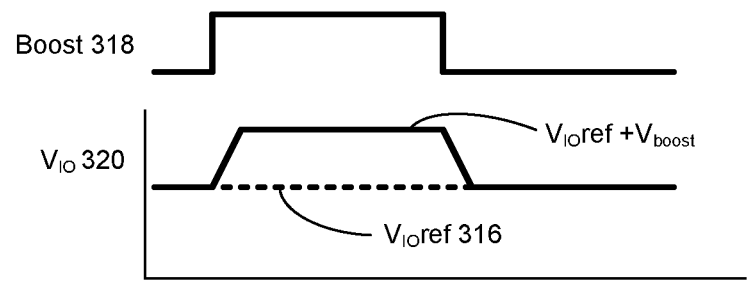
FIG. 3B presents a timing diagram for the circuit illustrated in FIG. 3A in accordance with disclosed embodiments.

The boosted voltage swing is provided by a voltage regulator VIOReg 304, which normally supplies a voltage VIO 320=VIOref 316. However, when boost signal 318 is asserted, voltage VIO 320 (which is supplied to the driver 302) increases above VIOref 316 to a boosted voltage level as is illustrated by the graph which appears in FIG. 3B. Hence, asserting boost signal 318 causes the voltage supplied to driver 302 to be increased, which increases the voltage swing or data-carrying level of driver 302.

In one embodiment, an increased edge rate is provided by one or more adjustable resistors. More specifically, driver 302 comprises a switch 311 which selectively couples the output of driver 302 to either VIO 320 through adjustable resistor 310, or to ground through adjustable resistor 312. Note that the edge rate provided by driver 302 can be increased by reducing the resistance provided by one or more of adjustable resistors RUP 310, RDN 312 and RODT 314. Note also that an increase or decrease in edge rate should not be confused with a change in data rate—notwithstanding change in transmitter settings, receiver settings or equalization parameters, data typically continues to be transmitted at substantially the same number of bits per second during both the transient period and any adjacent normal operating mode. As used herein, a normal operating mode simply means, relative to a transient period, that transmitter or receiver settings or equalization parameters become indefinite or steady state; a normal operating mode in this context can exist for different power states, with data rate or other differences applied between these states.

Although the implementation illustrated in FIG. 3A facilitates both a boosted voltage swing and an increased edge rate, other embodiments (without adjustable resistors) may provide only the boosted voltage swing, while other embodiments (without the voltage regulator boost function) may provide only the increased edge rate.

Figure 4A:
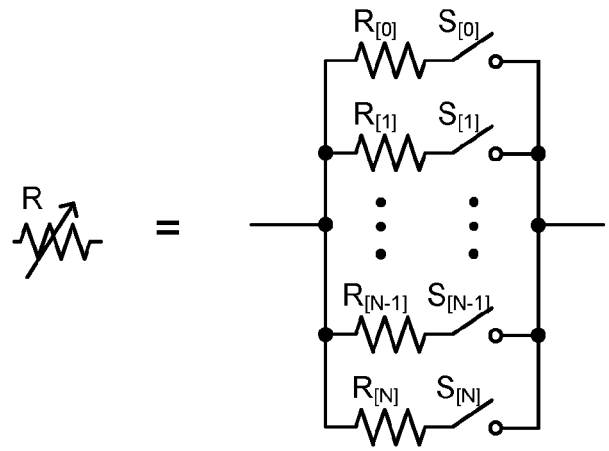
FIG. 4A illustrates an implementation of an adjustable resistor in accordance with disclosed embodiments.

FIG. 4A illustrates a possible implementation for an adjustable resistor, such as adjustable resistors RUP 310, RDN 312 and RODT 314, in accordance with disclosed embodiments. The adjustable resistor illustrated in FIG. 4A includes a set of resistances R[0], . . . , R[N], which are coupled to corresponding switches S[0], . . . , S[N] to form resistor-switch pairs. These resistor-switch pairs are coupled together in parallel, which enables different numbers of switches to be opened or closed to increase or decrease the resistance through the adjustable resistor. Note that increasing the number of resistors which are coupled in parallel decreases the overall resistance of the adjustable resistor. Also note that the system can support two (or more) resistance settings for each adjustable resistor based on two (or more) pre-defined resistances, which can be set by loading specific digital control words. During the transient period, a first digital control word is used (e.g., the system operates in a first mode during this period) and following this transient period, a second digital control word is used (e.g., the system operates in a second mode during this period).

Receiver Circuitry

These techniques need not only be applied to adjust transmitter settings. For example, it was earlier mentioned in connection with FIG. 1A that one implementation consolidates power-hungry circuitry on one side of a data path (such as path 108) while minimizing the use of power-hungry circuitry on the other side of the data path (e.g., in a legacy memory device). If, following a clock stoppage event, data is to be immediately transmitted from such a legacy memory device to a memory controller, it may be that an opportunity to adjust settings to compensate for transients exists only on the receiver side of the data path. It is of course also possible to adjust edge rate, equalization, or other receiver settings so as to similarly compensate for transients associated with a deterministic event. Note that one embodiment provides a single integrated circuit with both transmitter and receiver connected to a bidirectional lane, where each of this transmitter and receiver include circuitry as described herein to address reliability issues associated with transients.

Figure 4B:
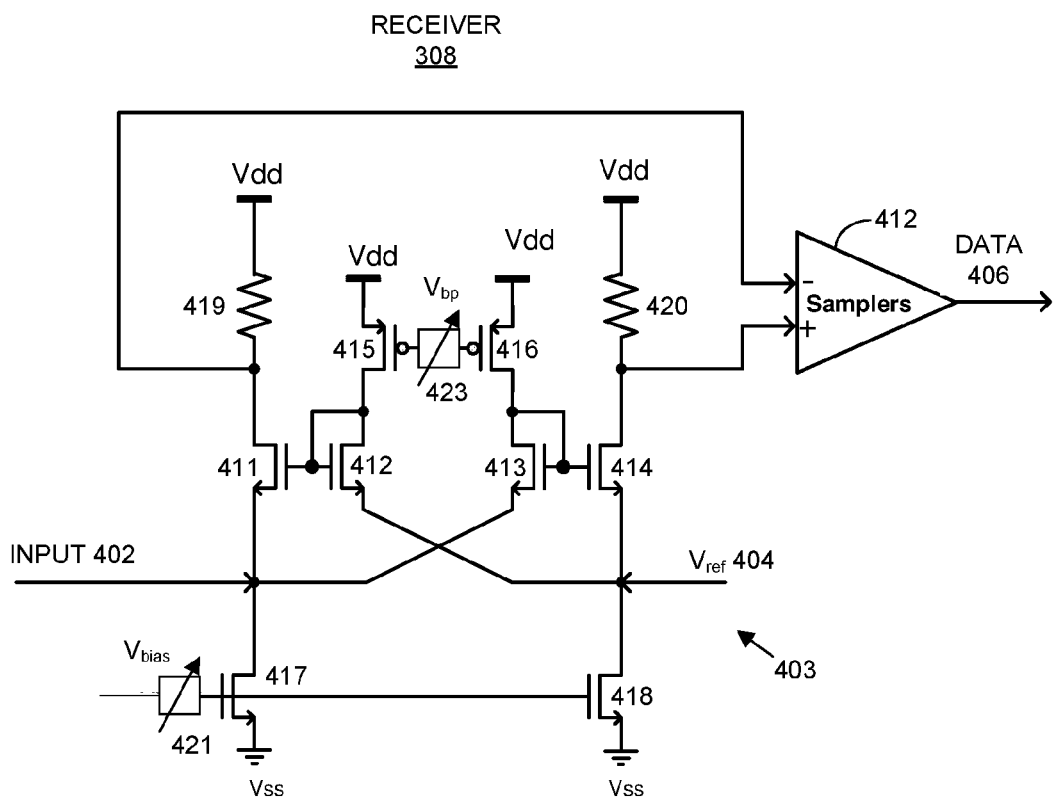
FIG. 4B illustrates an implementation of a receiver in accordance with disclosed embodiments.

FIG. 4B presents exemplary receiver circuitry 308 directed to this purpose. Note that FIG. 4B merely presents an exemplary implementation of receiver 308 and other implementations are possible. The receiver circuitry generally includes two circuits including a gain circuit 403 and a set of samplers 412. During operation, the gain circuit 403 compares an input signal 402 with a reference voltage Vref 404. This comparison is performed by a comparison circuit comprising N-type transistors 411-414, P-type transistors 415-416, N-type bias transistors 417-418 and resistors 419-420. The extent of gain can be adjusted during a transient event by increasing Vbias circuit 421 and/or reducing Vbp circuit 423 to compensate for transient events, and thereafter, reducing these circuits to steady state operating conditions. Results of the comparisons are sampled by samplers 412, which produce the received data 406. Note that the same (or similar) results can be obtained by varying a reference voltage or terminations (i.e., impedances) of the receiver using the same techniques as presented above for the transmitter, e.g., using the circuit of FIG. 4A to adjust receiver-side impedances. Also note that, as with the transmitter techniques presented earlier, in both a first mode (normal operating mode) and a second mode (compensating for transient effects), data is transmitted at a consistent data rate, that is, the adjustments to transmitter/receiver settings and equalization parameters adjust the electronic treatment of signals without substantially adjusting the rate or relative timing at which those signals are transmitted/received.

Figure 4C:
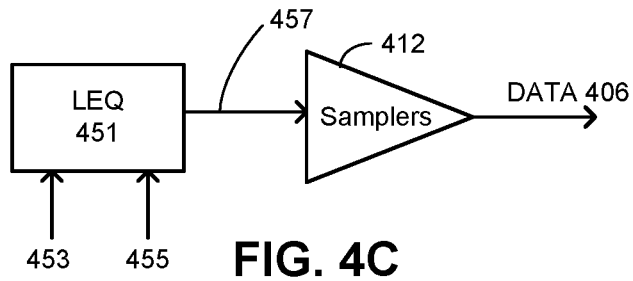
FIG. 4C illustrates an implementation of a receiver in accordance with disclosed embodiments.

FIG. 4C illustrates a variant to the system of FIG. 4B, where gain is provided by a programmable linear or continuous-time equalizer ("LEQ") 451. The LEQ 451 receives two control inputs, including a first input 453 to adjust cut-off frequency and a second input 455 to adjust gain. These settings can be defined in a first manner for a transient period (e.g., to more aggressively dampen high frequency ringing) and then readjusted at the end of the transient period in accordance with the teachings provided above. The LEQ 451 outputs an equalized signal 457 that is then provided to samplers 412, to thereby obtain output data 406.

Transmitter Circuitry: Voltage Regulators

Figure 5A:
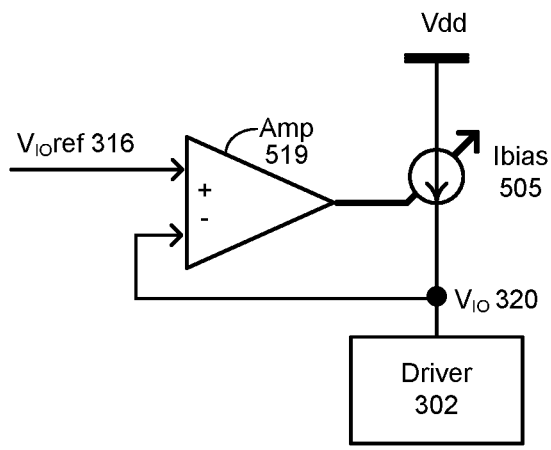
FIG. 5A illustrates a typical VIO regulator.

For embodiments that adjust transmitter settings, there are a number of different ways to implement a voltage regulator which can produce different voltages to power a transmitter, such as VIOReg 304 in FIG. 3. A typical voltage regulator, which only supplies a single voltage, is illustrated in FIG. 5A. This voltage regulator includes an operational amplifier (op amp) 519 and an adjustable current source Ibias 505. During operation, op amp 519 compares a reference voltage VIOref 316 against the voltage regulator output VIO 320. Based on this comparison, op amp 519 controls adjustable current source Ibias 505 so that VIO 320 tracks VIOref 316.

Figure 5B:
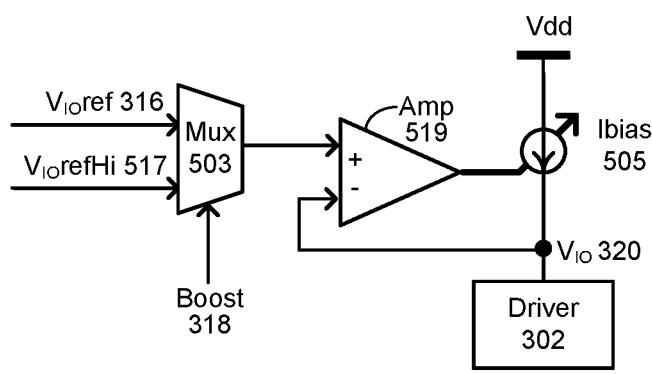
FIG. 5B illustrates a VIO regulator with a boost function in accordance with disclosed embodiments.

In contrast, FIG. 5B illustrates a VIO regulator with a boost function. The voltage regulator in FIG. 5B is similar to the voltage regulator illustrated in FIG. 5A, except that instead of feeding VIOref 316 directly into the positive input of op amp 519, VIOref 316 feeds into a first input of a multiplexer (mux) 503. A second input of mux 503 receives a high voltage reference VIOrefHi 517, and the control input of mux 503 receives boost signal 318. Finally, the output of mux 503 feeds into the positive input of op amp 519. Through this circuit, boost signal 318 can be used to control whether op amp 519 receives VIOref 316 or VIOrefHi 517 as a reference voltage input. When boost signal 318 is not asserted, the reference voltage input of op amp 519 is switched to VIOref 316, which causes the output of the voltage regulator VIO 320 to track VIOref 316. In contrast, when boost signal 318 is asserted, the reference voltage input of op amp 519 is switched to VIOrefHi 517, which causes the output of the voltage regulator VIO 320 to track VIOrefHi 517.

Figure 5C:
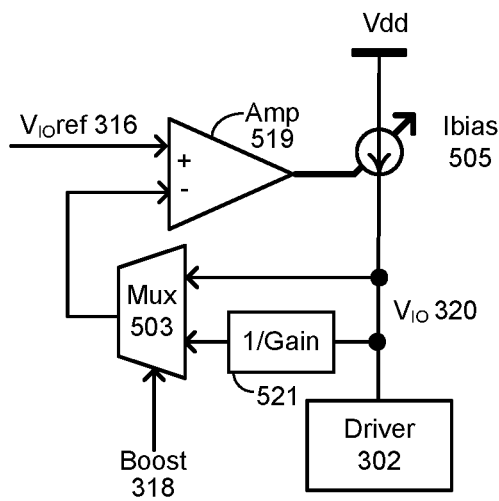
FIG. 5C illustrates another VIO regulator with a boost function in accordance with disclosed embodiments.

FIG. 5C illustrates another implementation for a VIO regulator with a boost function in accordance with disclosed embodiments. The voltage regulator in FIG. 5C is similar to the voltage regulator illustrated in FIG. 5A, except that instead of VIO 320 feeding directly into the negative input of op amp 519, VIO 320 feeds into a first input of mux 503. VIO 320 also feeds through 1/Gain element 521 into a second input of mux 503, and boost signal 318 feeds into the control input of mux 503. Finally, the output of mux 503 feeds into the negative input of op amp 519. In this circuit, when boost signal 318 is not asserted, the negative input of op amp 519 is switched to VIO 320, which causes the output of the voltage regulator VIO 320 to track VIOref 316. In contrast, when boost signal 318 is asserted, the negative input of op amp 519 is switched to VIO 320/Gain, which causes VIO 320/Gain to track VIOref 316, which means that the output of the voltage regulator VIO 320 tracks Gain*VIOref 316.

Figure 5D:
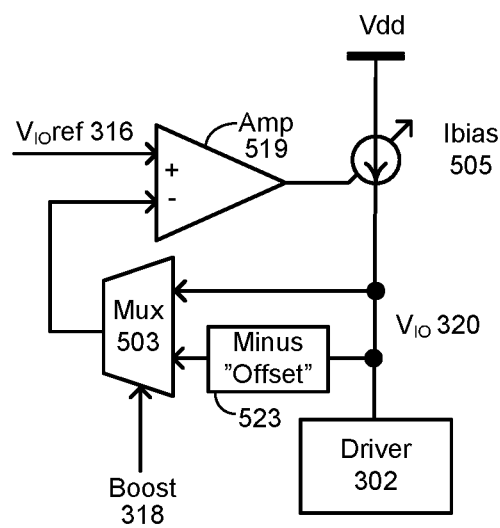
FIG. 5D illustrates yet another VIO regulator with a boost function in accordance with disclosed embodiments.

FIG. 5D illustrates yet another VIO regulator with a boost function in accordance with disclosed embodiments. The voltage regulator in FIG. 5D is similar to the voltage regulator illustrated in FIG. 5A, except that instead of VIO 320 feeding directly into the negative input of op amp 519, VIO 320 feeds into a first input of mux 503. VIO 320 also feeds through "−Offset" element 523 into a second input of mux 503, and boost signal 318 feeds into the control input of mux 503. Finally, the output of mux 503 feeds into the negative input of op amp 519. In this circuit, when boost signal 318 is not asserted, the negative input of op amp 519 is switched to VIO 320, which causes the output of the voltage regulator VIO 320 to track VIOref 316. In contrast, when boost signal 318 is asserted, the negative input of op amp 519 is switched from VIOref 316 to VIO 320-Offset, which causes VIO 320-Offset to track VIOref 316, which means that the output of the voltage regulator VIO 320 tracks VIOref 316+Offset.

Each of the VIO regulators illustrated in FIGS. 5B-5D can be implemented to provide the boost function. Alternative circuits can also be used. Moreover, any of these can be used in combination.

Figure 5E:
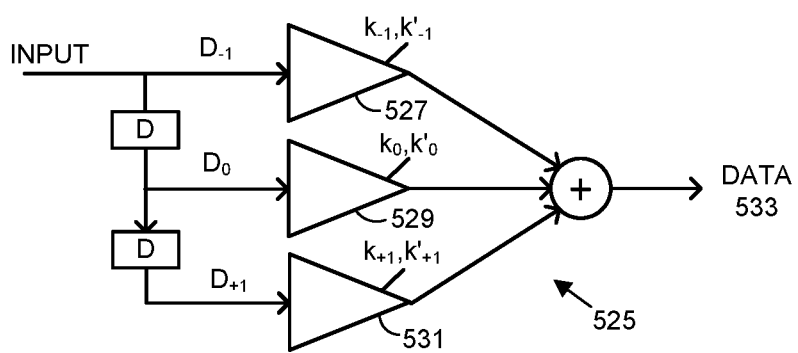
FIG. 5E illustrates a transmitter having multiple subdrivers.

FIG. 5E presents yet another embodiment, where a transmitter circuit 525 has a number of subdrivers 527, 529 and 531, employed as part of a current-mode transmitter-equalizer. More specifically, each subdriver receives a respective data bit (D–1D0, D+1 . . . ) in a sequence of data bits and a predetermined drive strength (k–1, k0, k+1 . . . ) representing contribution of the respective data bit to an output data signal 531. As with the receiver-based equalization adjustment scheme introduced above, a first set of equalization parameters can be applied during the transient period (i.e., k'–1, k'0, k'+1 . . . ), followed by a second set of equalization parameters for steady state operation (e.g., k–1, k0, k+1 . . . ), in respective first and second modes. Note that while it is generally desirable to emphasize transitions to adjust for channel-induced high frequency attenuation, such emphasis (or equivalently, deemphasis of low frequency signals) if desired can be made more pronounced during the transient period. In a variant of the system of FIG. 5E, any one or more of the subdrivers can be designed in the manner of FIGS. 5A-D, that is, to have a voltage boost, edge, or other adjustment that is applied on a selective to the particular subdriver during the transient period.

Results

Figure 6A:
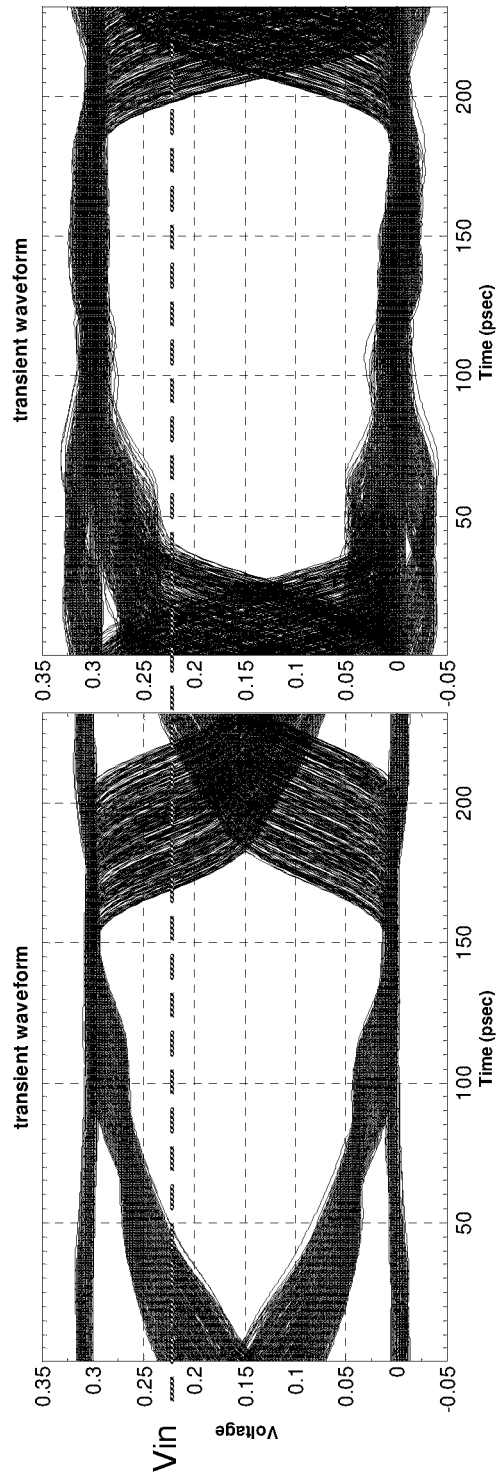
FIG. 6A illustrates how boosting the transmitter edge rate affects a resulting data eye in accordance with disclosed embodiments.

FIG. 6A presents a graph illustrating how boosting the transmitter edge rate affects a resulting data eye in accordance with disclosed embodiments. The graph on the left-hand side of FIG. 6A illustrates a data eye that results during the transition from a standby power state to an active power state. In contrast, the graph on the right-hand side of FIG. 6A illustrates a data eye that results when the transmitter edge rate is boosted during this transition period. Note that boosting the transmitter edge rate increases the size and consistency of the data eye. This larger data eye makes the system less susceptible to voltage noise, which means that bit errors are less likely to occur.

Figure 6B:
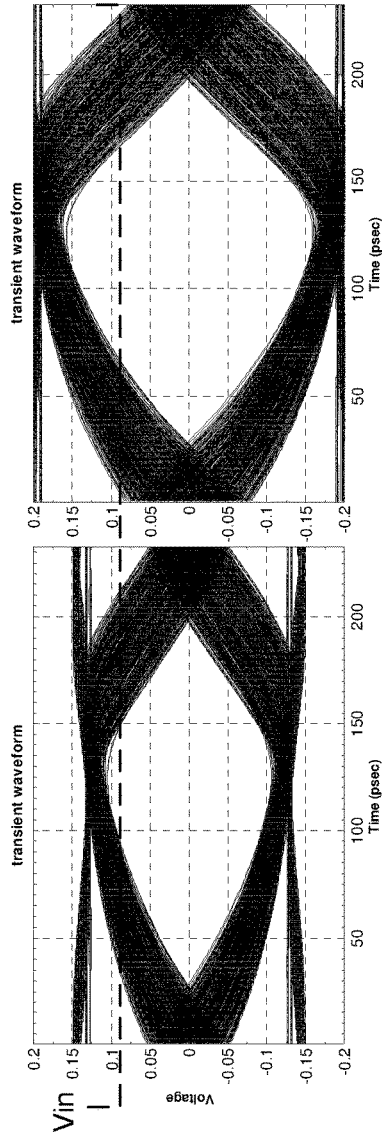
FIG. 6B illustrates how boosting the transmitter voltage swing affects a resulting data eye in accordance with disclosed embodiments.

FIG. 6B presents a graph illustrating how boosting the transmitter voltage swing affects a resulting data eye in accordance with disclosed embodiments. As in FIG. 6A, the graph on the left-hand side of FIG. 6B illustrates a data eye that results during the transition from a standby power state to an active power state. In contrast, the graph on the right-hand side of FIG. 6B illustrates a data eye that results when the voltage swing (instead of the edge rate) is boosted during this transition period. Note that boosting the voltage swing increases the size of the data eye, especially the height, facilitating logic state discrimination, which means that bit errors are less likely to occur.

Avoiding DFE Propagation Errors

Figure 7:
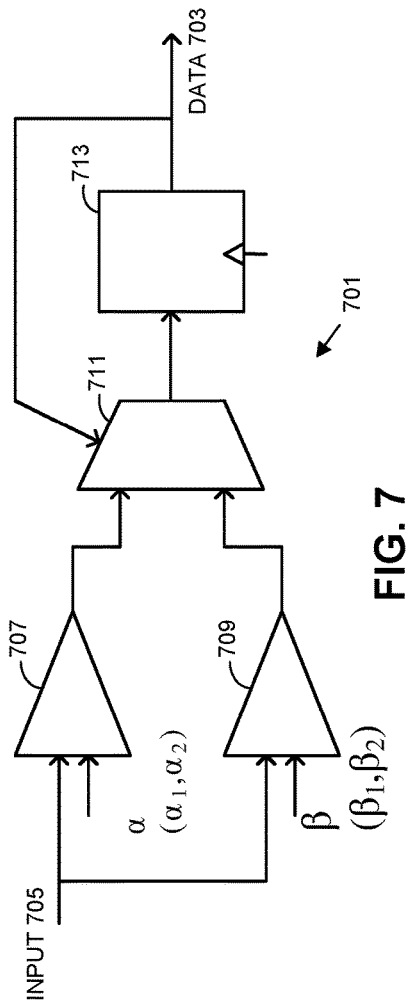
FIG. 7 illustrates a partial response equalizer in accordance with disclosed embodiments.

Another application of the above-described technique is to avoid propagation errors in a decision-feedback equalizer (DFE), such as a partial-response DFE ("prDFE") circuit 701 illustrated in FIG. 7. As with other DFE circuits, a prDFE uses the results of one or more previous bit detections (such as represented by data output 703) to properly equalize a current bit detection to reduce the error rate. As depicted in FIG. 7, for a prDFE, an input 705 is sampled on a conditional basis by two different samplers 707 and 709, each applying a respective sampling threshold, $\alpha$ or $\beta$; the threshold $\alpha$ presumes residual voltage representing a first logic state from the preceding data bit, while the threshold $\beta$ presumes residual voltage representing a second logic state from the preceding data bit; a multiplexer 711 is used to select the appropriate sample based on the logic state of previous data bit output 703. However, to operate correctly, the DFE must detect the first bits in a sequence correctly. Otherwise, previous bit errors will propagate through the DFE and may lead to unacceptable errors. Hence, when a DFE system starts transmitting data after an idle operation, the system typically starts transmitting a preamble with one or two known training bits to ensure that the equalization process operates correctly. This is typically done by outputting a known bit pattern for the preamble, such as 11. However, note that transmitting this preamble involves additional delay.

Instead of transmitting this known preamble, some of disclosed embodiments simply boost the transmitter voltage swing and/or edge rate, apply different transmitter equalization parameters, or apply similar forms different receiver settings for a number of bits after an idle period. This ensures that the first few bits will be read correctly, which means it is no longer necessary to transmit a DFE preamble after an idle period. For example, with reference to the prDFE system 701 of FIG. 7, the respective thresholds $\alpha$ and $\beta$ can be selected to be a first set of thresholds $\alpha 1$, $\beta 1$ during the transient period, and a second set of thresholds $\alpha 2$, $\beta 2$ following the transient period. Alternatively, receiver gain, termination or other parameters can be adjusted during a transient period, and/or transmitter adjustment can also be used. Note that irrespective of any differing impact upon the data eye, the use of transient transmitter (or receiver) settings facilitates immediate operation of the system, without the need for a preamble. Note also that these techniques may be used to mitigate transient effects associated with deterministic events quite apart from any voltage supply noise cause by the deterministic events. Also, while illustrated for a prDFE, the principles described above apply to any form of DFE.

Process of Changing Transmitter/Receiver Settings

Figure 8A:
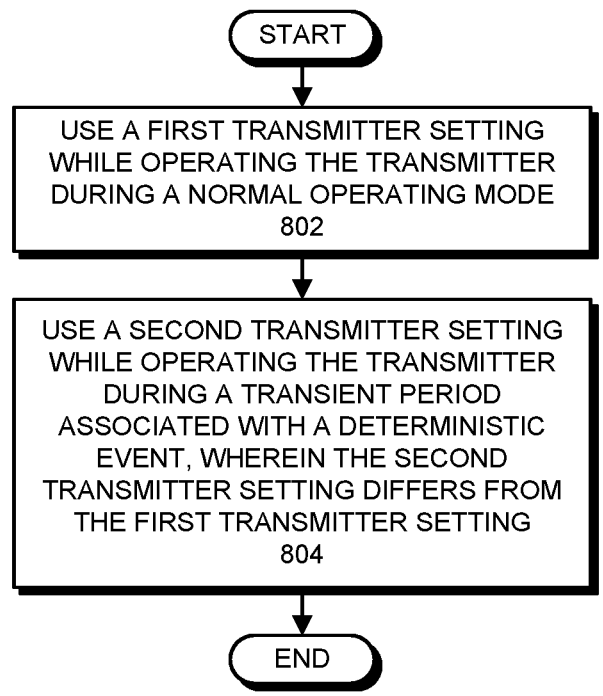
FIG. 8A presents a flow chart of the process of changing transmitter settings during a transient period associated with a deterministic event in accordance with disclosed embodiments.

FIG. 8A presents a flow chart of the process of changing transmitter settings during a transient period associated with a deterministic event in accordance with disclosed embodiments. The transmitter may use a first transmitter setting while operating during a normal operating mode (step 802). The transmitter uses a second transmitter setting while operating during a transient period associated with a deterministic event, wherein the second transmitter setting differs from the first transmitter setting (step 804). Note that the data transfer rate (data rate) of the transmitter does not have to change between the normal operating mode and the transient period. Also note that the term "transient period" refers to a temporary time period which follows a deterministic event. In many cases, a system parameter, such as a supply voltage, temporarily changes during this transient period.

Figure 8B:
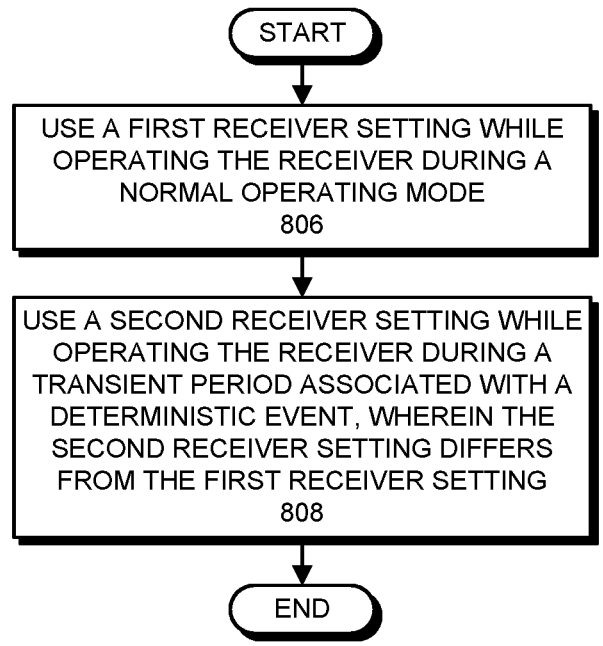
FIG. 8B presents a flow chart of the process of changing receiver settings during a transient period associated with a deterministic event in accordance with disclosed embodiments.

Note that receiver settings can change in the same way. More specifically, FIG. 8B presents a flow chart of the process of changing receiver settings during a transient period associated with a deterministic event in accordance with disclosed embodiments. The receiver uses a first receiver setting while operating during a normal operating mode (step 806). The receiver uses a second receiver setting while operating during a transient period associated with a deterministic event, wherein the second receiver setting differs from the first receiver setting (step 808).

Integrated Circuit

Figure 9:
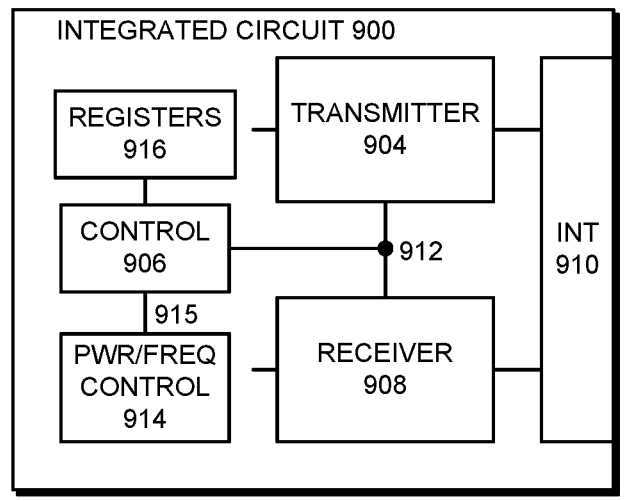
FIG. 9 illustrates an integrated circuit with a transmitter and a receiver in accordance with disclosed embodiments.

FIG. 9 illustrates an integrated circuit 900 with a transmitter 904 and a receiver 908 in accordance with disclosed embodiments. This implementation can be advantageously used, for example, in connection with embodiments where it is desired to use the integrated circuit 900 in conjunction with other, legacy devices. For example, integrated circuit 900 has circuitry that can be used to immediately transmit or receive data over a bidirectional lane or respective unidimensional transmission paths notwithstanding a transient period associated with a deterministic event, and notwithstanding whether the other device(s) possesses circuitry to mitigate the effects of deterministic events. The other device can be a second integrated circuit, and transmitter 904 and receiver 808 communicate with this second integrated circuit through an interface 910.

Transmitter 904 and receiver 908 receive a control signal 912 from a control circuit 906. During a normal operating mode, control signal 912 causes the transmitter to use a first transmitter setting and the receiver to use a first receiver setting (or equalization setting(s)). In contrast, during a transient period associated with a deterministic event, control signal 912 causes the transmitter to use a second transmitter setting and the receiver to use a second receiver setting (or respective equalization setting(s)).

Control circuit 906 receives one or more signals 915 from a power/frequency control mechanism 914 with integrated circuit 900. Note that power/frequency control mechanism 914 adjusts the power and clock frequency provided to various components within integrated circuit 900, or adjusts to system commands for doing the same (e.g., commands arising from a host, not shown in FIG. 9). The signals 915 that control circuitry 906 receives from power/frequency control mechanism 914 enable control circuit 906 to determine when a deterministic event, such as a change in a system power state, is to occur. For example, in one embodiment, power/frequency control mechanism 914 can monitor a system load, and can attempt to conserve power by selectively reducing a clock frequency and voltage supplied to components within integrated circuit 900. This reduction in clock frequency and voltage constitutes a deterministic event which can cause control circuit 906 to adjust various settings for transmitter 904 and receiver 908. Note that mode and per mode settings such as digital control words, equalization mode drive strengths, and the other values used to control transmitter, receiver or other settings can be stored in a registers 916.

Multiple Transmitters and Receivers

Figure 10:
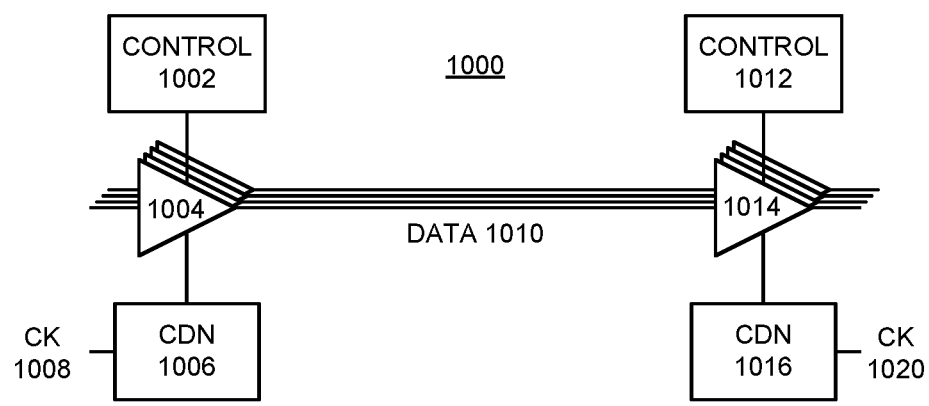
FIG. 10 illustrates a clocked system with multiple transmitters and receivers in accordance with disclosed embodiments.

FIG. 10 illustrates a clocked system 1000 with multiple transmitters 1004 and multiple receivers 1014 in accordance with disclosed embodiments. In the illustrated embodiment, each of the multiple transmitters 1004 receives a clock signal from a transmitter-side clock distribution network (CDN) 1006 which itself receives an input clock signal 1008; this clock signal can be shared between transmitters 1004 or it can be in the form of respective clock signals, each with a respective phase offset to compensate for intra-lane skew. Similarly, each of the multiple receivers 1014 receives a clock signal from a receiver-side CDN 1016 which itself receives clock signal 1020, wherein this clock signal 1020 may or may not be received from the transmitter side of the system. Once again, each receiver 1014 can share a common clock signal or receive a phase-adjusted signal dedicated to the specific receiver.

In the system of FIG. 10, each of the multiple transmitters 1004 can receive a control signal from transmitter-side control circuitry 1002, and each of the multiple receivers 1014 can receive a control signal from receiver-side control circuitry 1012. These control signals can be used to change transmitter and receiver settings, as appropriate. For example, the control signals can all be adjusted in parallel between a first setting for a normal operating mode and a second setting for a transient period associated with a deterministic event. Note that the transmitter settings can be calibrated separately for each transmitter, and the receiver settings can be calibrated separately for each receiver. This facilitates adjusting the voltage or edge rate for any given transmitter/receiver (i.e., per channel), for example, by an offset. This enables the system to control multiple transmitters for respective communication lanes, each of which can be calibrated slightly differently, but such that the voltage boost (or edge rate change) is applied to the multiple transmitters and receivers in parallel. The system in FIG. 10 can be implemented such that both transmitter and receiver for any given lane (represented by paths 1010) compensate for transient effects, or where only one side 1004 or the other 1014 applies such compensation.

The preceding description was presented to enable any person skilled in the art to make and use disclosed embodiments, and is provided in the context of a particular application and its requirements. Various modifications to disclosed embodiments will be readily apparent to those skilled in the art, and the general principles defined herein may be applied to other embodiments and applications without departing from the spirit and scope of disclosed embodiments. Thus, disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in, but are not limited to, application-specific integrated circuit (ASIC) chips, field-programmable gate arrays (FPGAs), and other programmable-logic devices.

What is claimed is:

1. A method for operating an integrated circuit receiver, comprising:

operating a receive circuit of the receiver during a normal operating mode, the receive circuit responsive to a first predetermined receiver setting to receive an input signal transmitted along a signaling channel, the input signal exhibiting first signal characteristics; and operating the receiver circuit during a transient period associated with a deterministic event, the receiver circuit responsive to a second predetermined receiver setting to alter the input signal to exhibit second signal characteristics that compensate for signal impairments to the input signal during the transient period, wherein the second predetermined receiver setting differs from the first predetermined receiver setting, and wherein the first and second predetermined receiver settings are from a group consisting of a reference voltage, an impedance level, a gain, a frequency cut-off and an equalization parameter.

2. The method of claim 1, wherein the first predetermined receiver setting and the second predetermined receiver setting provide different receiver reference voltages.

3. The method of claim 1, wherein the first predetermined receiver setting and the second predetermined receiver setting provide different gain values.

4. The method of claim 1, wherein the first predetermined receiver setting and the second predetermined receiver setting include different receiver equalization settings.

5. The method of claim 1, wherein the first predetermined receiver setting and the second predetermined receiver setting provide different receiver impedances.

6. The method of claim 1, wherein the receiver operates at the same data rate during the normal operating mode and during the transient period.

7. The method of claim 1, wherein the transient period occurs after the deterministic event.

8. The method of claim 1, applied to a plurality of receivers, each to receive a signal along a respective lane, wherein:
each receiver in the plurality of receivers uses
a first predetermined receiver setting while operating during a normal operating mode, and
a second predetermined receiver setting while operating during a transient period associated with a deterministic event.

9. An apparatus, comprising:
a receiver;
wherein the receiver is responsive to a first predetermined receiver setting while operating during a normal operation mode to receive an input signal transmitted along a signaling channel, the input signal exhibiting first signal characteristics ; and
wherein the receiver is responsive to a second predetermined receiver setting to alter the input signal to exhibit second signal characteristics that compensate for signal impairments to the input signal while operating during a transient period associated with a deterministic event, wherein the second predetermined receiver setting differs from the first predetermined receiver setting, and wherein the first and second predetermined receiver settings are from a group consisting of a reference voltage, an impedance level, a gain, a frequency cut-off and an equalization parameter.

10. The apparatus of claim 9, wherein the first predetermined receiver setting and the second predetermined receiver setting provide different receiver reference voltages.

11. The apparatus of claim 9, wherein the first predetermined receiver setting and the second predetermined receiver setting provide different receiver gain values.

12. The apparatus of claim 9, wherein the first predetermined receiver setting and the second predetermined receiver setting include different receiver equalization settings.

13. The apparatus of claim 9, wherein the first predetermined receiver setting and the second predetermined receiver setting provide different receiver impedances.

14. The apparatus of claim 9, wherein the receiver operates at the same data rate during the normal operating mode and during the transient period.

15. The apparatus of claim 9, wherein:
the apparatus further comprises a plurality of receivers; and
each receiver in the plurality of receivers,
uses a first predetermined receiver setting while operating during a normal operating mode, and
uses a second predetermined receiver setting while operating during a transient period associated with a deterministic event.

16. The apparatus of claim 9, wherein:
the receiver further includes an equalizer, the equalizer to equalize a current data bit to compensate for interference associated with other data bits; and
wherein the equalizer,
uses a first predetermined equalizer setting while operating during a normal operating mode, and
uses a second predetermined equalizer setting while operating during a transient period associated with a deterministic event.

17. The apparatus of claim 9, further comprising a register to store a value that causes the first predetermined receiver setting or the second predetermined receiver setting to be applied to the receiver depending on a state of the value.

18. An integrated circuit, comprising:
a transmitter to transmit a first data signal;
a receiver to receive a second data signal, the receiver including an equalizer; and
control circuitry to change, responsive to a deterministic event, a setting of each of the transmitter and the receiver during their respective operation during a transient time period associated with the deterministic event;
wherein
the transmitter and the receiver each respectively transmit at a substantially constant data rate and receive at a substantially constant data rate during both of a normal operating mode the during transmit time period, and
the setting is from a group consisting of a voltage swing, an impedance level, a gain, a frequency cut-off and an equalization parameter.

19. The integrated circuit of claim 18, wherein the equalizer comprises a linear equalizer.

20. The integrated circuit of claim 18, wherein the equalizer comprises a decision-feedback equalizer (DFE).

* * * * *